May 24, 1960 D. H. PRITCHARD 2,938,071

COLOR TELEVISION MATRIX DEMODULATOR

Filed Oct. 8, 1954 2 Sheets-Sheet 1

INVENTOR.
Dalton H. Pritchard
BY
[signature]
ATTORNEY

COLOR TELEVISION MATRIX DEMODULATOR

Filed Oct. 8, 1954 2 Sheets-Sheet 2

INVENTOR.
Dalton H. Pritchard
BY
[signature]
ATTORNEY

United States Patent Office 2,938,071

Patented May 24, 1960

2,938,071

COLOR TELEVISION MATRIX DEMODULATOR

Dalton H. Pritchard, Princeton, N.J., assignor to Radio Corporation of America, a corporation of Delaware Filed Oct. 8, 1954, Ser. No. 461,079

3 Claims. (Cl. 178—5.4)

The present invention relates to combined demodulator and matrix circuits for use in color television receivers.

In the color television signal which conforms to standards which were adopted by the Federal Communications Commission on Dec. 17, 1953, there is included a brightness or Y signal component which represents the brightness or monochrome information in the color television signal and a color information signal or chrominance signal which is transmitted in the form of a modulated subcarrier. This modulated subcarrier contains color difference signals which describe how each color in the televised scene differs from a monochrome version of that color having the same luminance. These color difference signals may be recovered at the receiver by synchronous demodulation of the modulated subcarrier in order to permit the employment of the processes of synchronous detection. In addition, a periodic color synchronizing burst yielding reference frequency and phase information is included in the color television signal to permit synchronization of a reference signal source which is utilized in the color television receiver to drive the synchronous demodulators which are employed to demodulate the required color difference signal information.

In conventional color television receivers, red, green and blue color difference signals, which are denoted as $R-Y$, $G-Y$, and $B-Y$ signals are utilized in conjunction with the luminance or Y signal which describes the brightness or monochrome information contained in the color television signal. It is possible to demodulate each of these desired color difference signals independently. However, the above-mentioned color difference signals may be formed in a suitable matrix circuit by combination of suitable magnitudes and polarities of other color difference signals contained in the chrominance signal.

It is an object of this invention to provide a simplified combined demodulator and matrix circuit for producing a trio of color difference signals from a chrominance signal.

It is yet another object of this invention to provide a circuit which yields a combination of synchronous detection amplifier and matrix circuit functions which provide recovery of the three color difference signals, $B-Y$, $R-Y$, and $G-Y$, required in a color television receiver, from the chrominance signal.

In one form of the invention, a trio of amplifiers is utilized in a combined demodulator and matrix circuit. One of the amplifiers is used as a cathode follower to accept the chrominance signal and to feed the signal to the second and third triode amplifiers; all three of the amplifiers have a common cathode resistor which not only acts as the cathode-follower output circuit of the first amplifier but also provides as a mutual coupling circuit for all the amplifiers. The second and third amplifiers are driven with synchronous demodulation signals of selected phases which are applied to the grids of the amplifier and provide color-difference signals across the common cathode resistor according to demodulation signal phases utilized. A first demodulating signal phase applied to the second amplifier is selected to be in the neighborhood of 180° out of phase with respect to the phase of the $R-Y$ color-difference signal; the second demodulating signal phase applied to the third amplifier lags this demodulating signal phase by approximately 50°. These demodulating signal phases produce a $G-Y$ color difference signal across the common cathode resistor and therefore in the plate circuit of the first amplifier. These demodulating signal phases also yield vector addition of proper amplitudes and polarities of the color-difference signals corresponding to the first and second demodulating signal phases in the plate circuits of the second and third amplifiers to produce pure $R-Y$ and $B-Y$ color difference signal information in these plate circuits respectively.

Other and incidental objects of this invention will become apparent upon a reading of the following specification and a study of the drawings wherein.

Figures 1, 2:
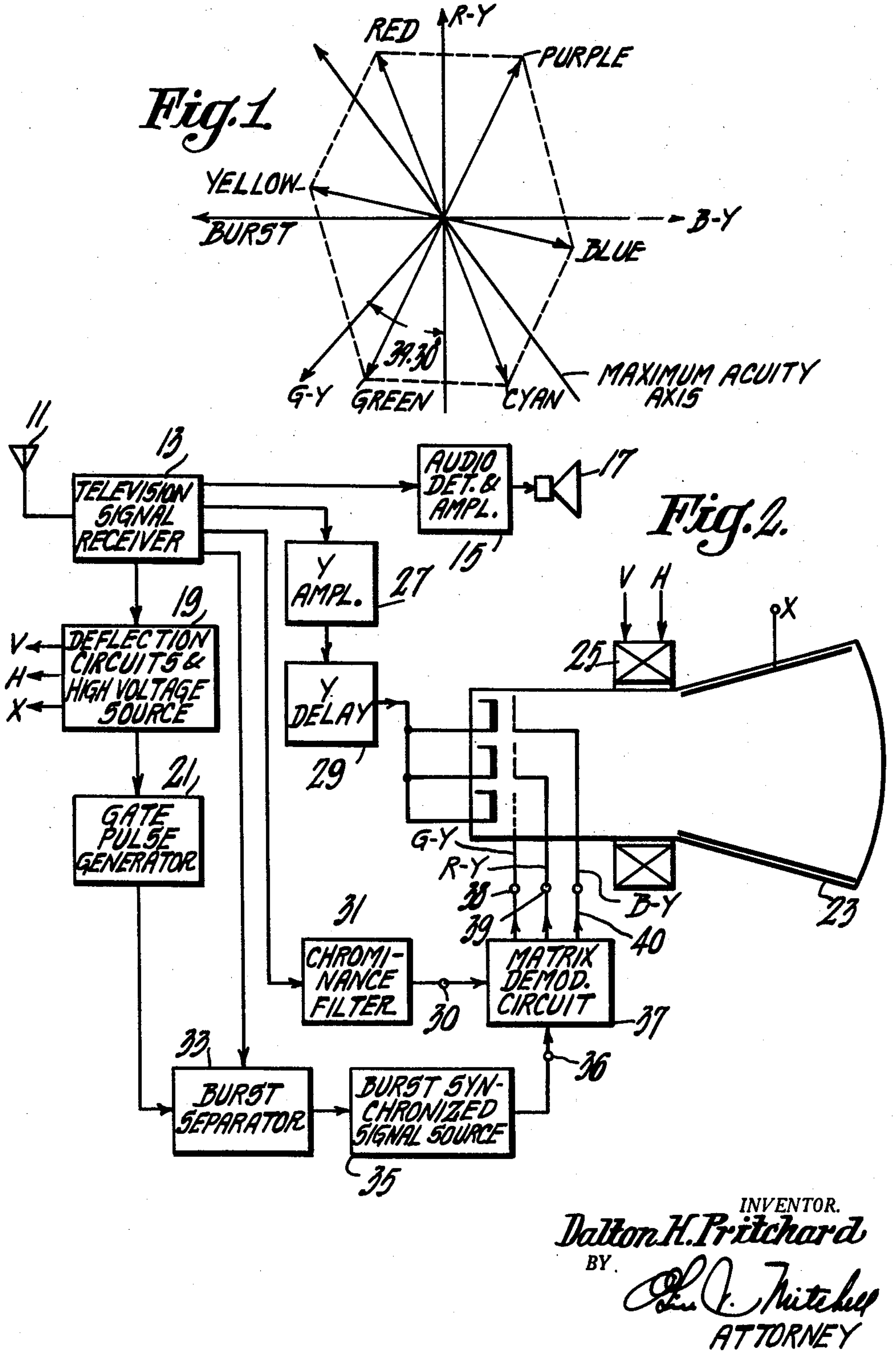
Figure 1 shows the vector relationship between the phases representing the color synchronizing burst and the various color difference signals which are included in the color subcarrier.
Figure 2 is a block diagram of a color television receiver which utilizes the matrix demodulator circuit which constitutes one form of the present invention.

Figure 1 is a vector diagram which relates the hue and saturation information to the reference phase angle which is provided by the color synchronizing burst. The precise phase angles employed therefore yield an indication of hue while the amplitudes of the various vectors yield information relating to color saturation. It is seen in Figure 1 that the phase of the color synchronizing burst leads the phase of the $R-Y$ signal by 90°, with the phase of the $R-Y$ color difference signal leading the phases of the $B-Y$ color difference signal and the $G-Y$ color difference signal by 90° and 214.3° respectively. These are only a few of the color difference signals which are included in the modulated color subcarrier or chrominance signal, since the chrominance signal yields information relating to a constant variation or change of hue as a function of phase angle.

It is important to note from the vector diagram of Figure 1 that it is also possible to produce one color difference signal by properly performing vector addition of two or more of the other color difference signals. It can be shown, for example, that a $G-Y$ color difference signal can be formed by combining values of $R-Y$ and $B-Y$ color difference signal information according to the relationship $$G-Y=-.51(R-Y)-.19(B-Y)$$

Consider now the color television receiver circuit which is shown in block diagram in Figure 2. Here the incoming carrier modulated color television signal is received by the antenna 11 and applied to the television signal receiver 13. The television signal receiver 13 performs the functions of first detection, intermediate frequency amplification, and second detection in addition to such secondary functions as automatic gain control and co-channel and adjacent-channel signal trapping. The television signal receiver 13 therefore yields the recovered color television signal which includes a sound modulated carrier which is transmitted 4½ mcs. removed from the video or picture carrier.

In one form of color television receiver, the sound or audio information may be recovered from the color television signal by use of an intercarrier sound circuit. The audio signal is thereby recovered and amplified in the audio detector and amplifier 15 and applied to the loud speaker 17.

In still another branch of the color television receiver, the color television signal representing luminance or Y information is passed through the Y amplifier 27 and the Y delay line 29 and applied to the cathodes of the color image reproducer 23. The color television receiver will be shown to operate whereby the matrix demodulator circuit 37 will apply appropriate color difference signal information to respective control electrodes of the color image reproducer so that signal addition of the Y information and the color difference signal information may be accomplished directly within the color image reproducer. In some forms of color television receivers, however, auxiliary circuits may be utilized for adding the luminance or Y signal to the respective color difference signals with the resultant component color signals then being applied to the color image reproducer.

The color television signal is applied to the deflection circuits and high voltage supply 19, which utilize the synchronizing signals transmitted with the color television signal to produce horizontal and vertical deflection signals which are applied to the yokes 25. In addition, excitation is provided for a high voltage supply which both produces the high voltage needed for the ultor of the color image reproducer 23 and also a driving signal for the gate pulse generator 21 which is adapted to provide a gate pulse having a duration interval at least that of the color synchronizing bursts which are transmitted on the back porch of the horizontal synchronizing pulses. The gate pulse generator 21 may be in the form of a kickback winding on a transformer which is associated with the high voltage supply or it may be a multivibrator circuit which is actuated by the horizontal synchronizing pulses. The output pulse of the gate pulse generator 21 is then applied to the burst separator 33 to which is also applied the color television signal. The burst separator 33 separates the color synchronizing bursts from the color television signal and applies the separated color synchronizing bursts to the burst synchronized signal source 35 which yields a continuous 3.58 mc. signal having a phase prescribed by the color synchronizing burst. The output of the burst synchronized signal source 35 is then applied to the input terminal 36 of the matrix demodulator circuit 37.

The color television signal is passed through the chrominance filter 31 which performs the functions of eliminating at least those luminance signal components having frequencies below 3 mcs. This provides a chrominance signal wherein the color difference signals involved will have an upper frequency limit of approximately 0.6 mc. The filtered chrominance signal is then applied to the input terminal 30 of the matrix demodulator circuit 37.

In a manner to be described later in the specification, the matrix demodulator circuit 37 accepts a filtered chrominance signal and also reference signal information from the burst synchronized signal source 35 and produces $G-Y$, $R-Y$, and $B-Y$ color difference signals at the output terminals 38, 39 and 40 respectively. These color difference signals are then applied to appropriate control electrodes of the color image reproducer 23 so that a color television image, corresponding to the color television signal, is produced on the image face of the color image reproducer 23.

Figure 3:
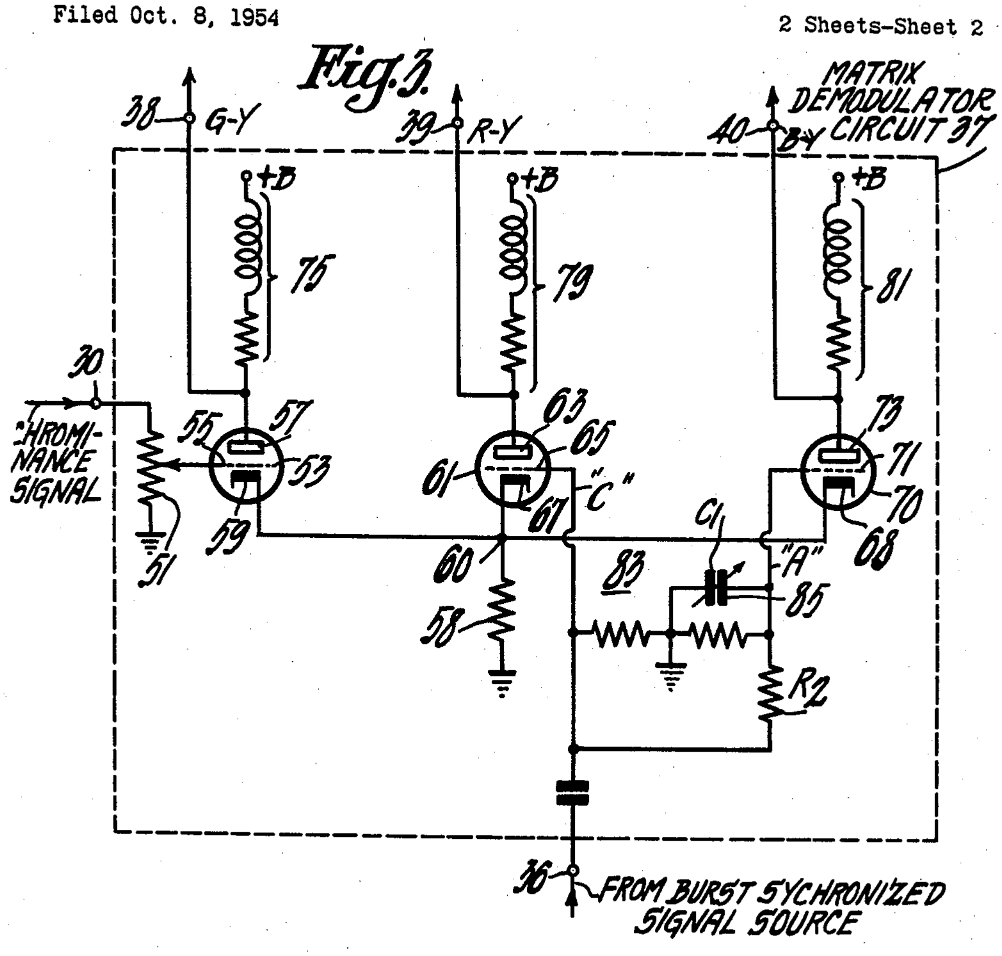
Figure 3 shows one embodiment of a matrix demodulator circuit which follows from the teachings of the present invention; and, Figure 4 is a vector diagram which shows how two color difference signals, A and B, may be combined to yield a resultant signal which has the phase and characteristics of $G-Y$ signal information.

Consider now the schematic diagram of the matrix demodulator circuit 37 which is shown in Figure 3; this schematic diagram illustrates one embodiment of the present invention. The chrominance signal as provided by the chrominance filter 31 to the input terminal 30 is developed across the potentiometer 51 which in turn applies the chrominance signal to the control grid 55 of the electron tube or amplifier device or electron flow device 53 at an amplitude level dependent upon the setting of the potentiometer 51. This chrominance signal is then developed across the cathode resistor 58. By choosing suitable frequency response characteristics of the output impedance or circuit 75 which is coupled to the output electrode or anode 57 of the electron tube 53, the chrominance signal will not be developed in that output impedance; the output impedance 75 should be designed to present suitable gain characteristics only for signals having a frequency range from substantially zero to ½ mc.

The cathode resistor or common impedance means 58 is coupled between ground and each of the cathodes or common electrodes 59, 67 and 69 of the tubes or amplifier devices 53, 61 and 70. The junction of the three cathodes is coupled to the high potential end of the common cathode resistor 58 and given the designator 60; this junction will be referred to as the cathode terminal 60.

Figure 4:
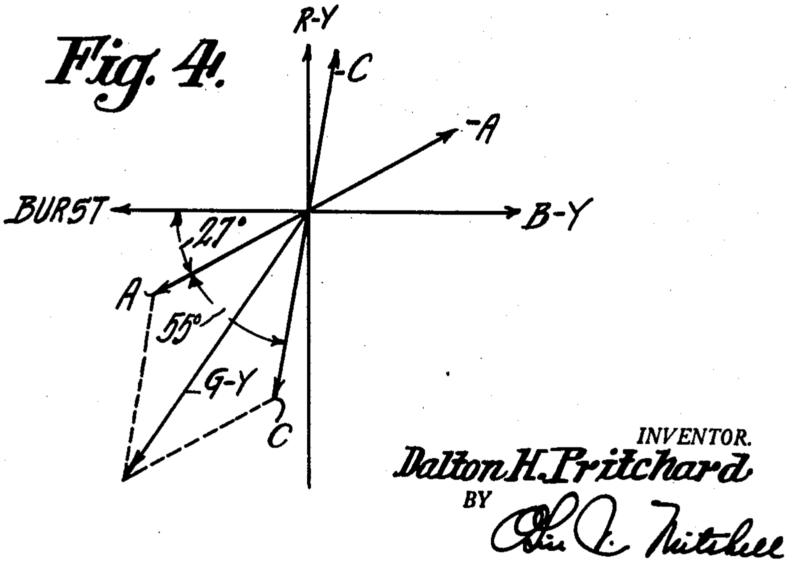

The operation of the form of the invention shown in Figure 3 will be better understood by a reference to the vector diagram of Figure 4 as well as the circuit diagram of Figure 3.

A signal from the burst synchronized signal source 35 as applied to the input terminal 36 is applied to the phase shifting network 83; this phase shifting network 83 applies a demodulating signal having the C-phase shown in Figure 4, to the control grid 65 to the electron tube 61 of the $R-Y$ demodulator while a demodulating signal having the A-phase, shown in Figure 4, is applied to the control grid 71 of the electron tube 70 of the $B-Y$ demodulator.

Consider first the case when, for example, the $B-Y$ demodulator is de-coupled from the $R-Y$ demodulator; this involves, for example, the detaching of the cathode 69 from the cathode 60. Since the chrominance signal developed across the cathode resistor 58 by the electron tube 53 is acted upon in the electron tube 61 by the C-phase demodulating signal, color difference information at the C-phase will be provided across the cathode resistor 58 and in reverse polarity as color difference signal information in the vicinity of the $R-Y$ phase across the output impedance 79 of the $R-Y$ demodulator.

Should the cathode 69 be recoupled to the cathode terminal 60, it is important to note that the C-phase color difference signal developed across the cathode impedance 58 will then appear as a +C-phase color difference signal across the output circuit 81. In like fashion, the signal at A-phase applied to the control grid 71 of the tube 70 will develop an A-phase color difference signal across the cathode resistor 58 and a +A-phase color difference signal across at least the output impedance 79.

The choice of the A and C demodulating signal phases is such that the A and C color difference signals as demodulated in the $B-Y$ and the $R-Y$ demodulators respectively will be combined across the output resistor 58 to produce a $G-Y$ signal which will in turn appear across the output impedance 75 and therefore appear at the output terminal 38.

In the $R-Y$ demodulator which utilizes the tube 61, the combination of a −C color difference signal therefore appearing across the output impedance 79 and a +A signal as coupled to the cathode 67 of the electron tube 61 from the $B-Y$ demodulator and therefore caused to appear across the output resistance 79 with suitable amplitude, will cause an $R-Y$ color difference signal to be produced at the output terminal 39.

The action of the A-phase demodulating signal applied to the control grid 71 will cause a −A color difference signal to appear across the output circuit 81. However, the $R-Y$ demodulator utilizing the tube 61 will couple a +C color difference signal into the output impedance 81 of sufficient amplitude to form the $B-Y$ signal which will then appear across the output terminal 40.

Having thus described the invention, what is claimed is:

1. In a color television receiver or the like, a matrix demodulator for providing three demodulated output signals corresponding with the color information at the $R-Y$, $B-Y$ and $G-Y$ phases of the chrominance signal, comprising: first, second and third amplifier devices each having a control electrode, an output electrode, and a common electrode, means providing a source of a chrominance signal, means coupling said source only to the control electrode of said first amplifier device, means including an impedance element connected in common with all of said common electrodes for coupling said chrominance signal to the common electrodes of said second and third amplifier devices, individual demodulated signal output circuits coupled to the output electrodes of respective ones of said three amplifier devices, means providing a source of demodulating oscillations, and coupling means to apply two selected phases of said oscillations to only control electrodes of respective ones of said second and third amplifier devices, said coupling means having characteristics whereby said two selected phases is different from each of said $R-Y$, $B-Y$ and $G-Y$ phases of the chrominance signal, the phases being selected so that the interaction between the second and third amplifier devices due to the common impedance causes the $G-Y$ demodulated output signals to appear across the common impedance and across the output circuit of said first amplifier device, and causes the $R-Y$ and $B-Y$ demodulated output signals to appear across the output circuits of respective ones of said second and third amplifier devices.

2. In a color television receiver or the like, a matrix demodulator for providing three demodulated output signals corresponding with the color information at three predetermined phases of the chrominance signal, comprising: first, second and third amplifier devices each having a control electrode, an output electrode, and a common electrode, means providing a source of a chrominance signal, means coupling said source only to the control electrode of said first amplifier device, means including an impedance element connected in common with all of said common electrodes for coupling said chrominance signal to the common electrodes of said second and third amplifier devices, individual demodulated signal output circuits coupled to the output electrodes of respective ones of said three amplifier devices, means providing a source of demodulating oscillations, and coupling means to apply two selected phases of said oscillations only to control electrodes of respective ones of said second and third amplifier devices, said coupling means having characteristics whereby each of said two selected phases is different from each of said predetermined phases of the chrominance signal, the phases being selected so that the interaction between the second and third amplifier devices due to the common impedance causes one of said demodulated output signals to appear across the common impedance and across the output circuit of said first amplifier device, and causes the other two desired demodulated output signals to appear across the output circuits of respective ones of said second and third amplifier devices.

3. In a color television receiver or the like, a matrix demodulator for providing three demodulated output signals corresponding with the color information at three predetermined phases of the chrominance signal, comprising: first, second and third electron flow devices each having a control electrode, an output electrode, and a common electrode, means providing a source of a chrominance signal, means coupling said source only to the control electrode of said first electron flow device, means including an impedance element connected in common with all of said common electrodes for coupling said chrominance signal to the common electrodes of said second and third electron flow devices, individual demodulated signal output circuits coupled to the output electrodes of respective ones of said three electron flow devices, means providing a source of demodulating oscillations, and coupling means to apply two selected phases of said oscillations only to control electrodes of respective ones of said second and third electron flow devices, said coupling means having characteristics whereby each of said two selected phases is different from each of said predetermined phases of the chrominance signal, the phases being selected so that the interaction between the second and third electron flow devices due to said impedance means causes one of said demodulated output signals to appear across the impedance means and across the output circuit of said first electron flow device, and causes the other two desired demodulated output signals to appear across the output circuits of respective ones of said second and third electron flow devices.

References Cited in the file of this patent

UNITED STATES PATENTS

| | | |
|---|---|---|
| 2,728,813 | Loughlin | Dec. 27, 1955 |
| 2,745,900 | Parker | May 15, 1956 |
| 2,845,481 | Lockhart | July 29, 1958 |